US010599878B2

(12) United States Patent
Kaladgi et al.

(10) Patent No.: US 10,599,878 B2
(45) Date of Patent: Mar. 24, 2020

(54) USING DECOY ICONS TO PREVENT UNWANTED USER ACCESS TO APPLICATIONS ON A USER COMPUTING DEVICE

(71) Applicant: CA, Inc., Islandia, NY (US)

(72) Inventors: Mohammed Mujeeb Kaladgi, Bangalore (IN); Ruqiya Nikhat Kaladgi, Bangalore (IN); Yashwant Ramkishan Sawant, Maharastra (IN); Sandeep Banisetti, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 299 days.

(21) Appl. No.: 15/817,670

(22) Filed: Nov. 20, 2017

(65) Prior Publication Data

US 2019/0156071 A1  May 23, 2019

(51) Int. Cl.
*G06F 21/84* (2013.01)
*G06F 21/62* (2013.01)
(Continued)

(52) U.S. Cl.
CPC ............ *G06F 21/84* (2013.01); *G06F 3/0482* (2013.01); *G06F 3/04817* (2013.01);
(Continued)

(58) Field of Classification Search
CPC .... G06F 3/04817; G06F 3/0482; G06F 21/84; G06F 21/6245; G06F 21/31;
(Continued)

(56) References Cited

U.S. PATENT DOCUMENTS 6,804,786 B1 * 10/2004 Chamley ................. G06F 21/34
235/380
9,270,670 B1 * 2/2016 Fitzgerald ............ H04L 63/083
(Continued)

OTHER PUBLICATIONS

Orobator, Andrew, "Implementing Android Shortcuts", The Android Developer Conference, Jul. 17-19, 2017, available online at <http://www.andevcon.com/news/implementing-android-app-shortcuts> (16 pages).
(Continued)

*Primary Examiner* — Ting Z Lee
(74) *Attorney, Agent, or Firm* — Morgan, Lewis & Bockius LLP

(57) ABSTRACT

Technologies are provided herein and include embodiments for protecting applications and information on a user computing device and include generating a menu of icons including an application icon and a decoy icon that correspond to a mobile application in a mobile device, where the application icon is assigned to a first location in the menu and the decoy icon is assigned to a second location in the menu. The embodiment further includes communicating icon location information to the mobile application, providing the menu of icons for display on a display screen of the mobile device, receiving a first indication of user input to select the decoy icon in the menu of icons, invoking the mobile application based on the decoy icon being selected, and communicating, to the mobile application based on the decoy icon being selected, second location information indicating the second location in the menu of icons.

17 Claims, 8 Drawing Sheets

(51) Int. Cl.
　　　*G06F 21/31*　　　(2013.01)
　　　*G06F 3/0481*　　(2013.01)
　　　*G06F 3/0482*　　(2013.01)
　　　*H04M 1/725*　　 (2006.01)
(52) U.S. Cl.
　　　CPC .......... *G06F 21/31* (2013.01); *G06F 21/6245*
　　　　　　(2013.01); *H04M 1/72519* (2013.01); *H04M*
　　　　　*1/72522* (2013.01); *H04M 1/72577* (2013.01);
　　　　　　*H04M 1/72583* (2013.01); *G06F 2221/2127*
　　　　　　　　(2013.01); *G06F 2221/2149* (2013.01)
(58) Field of Classification Search
　　　CPC .......... G06F 21/2127; H04M 1/72577; H04M
　　　　　　　1/72583; H04M 1/72522; H04M 1/72519
　　　See application file for complete search history.

(56) References Cited

U.S. PATENT DOCUMENTS

| | | | |
|---|---|---|---|
| 9,910,975 B2 * | 3/2018 | Yang | G06F 21/31 |
| 2009/0183266 A1 * | 7/2009 | Tan | G06F 21/88 |
| | | | 726/35 |

OTHER PUBLICATIONS

Wikipedia, Deception technology, Aug. 28, 2017, available online at <https://en.wikipedia.org/wiki/Deception_technology>(5 pages).

* cited by examiner

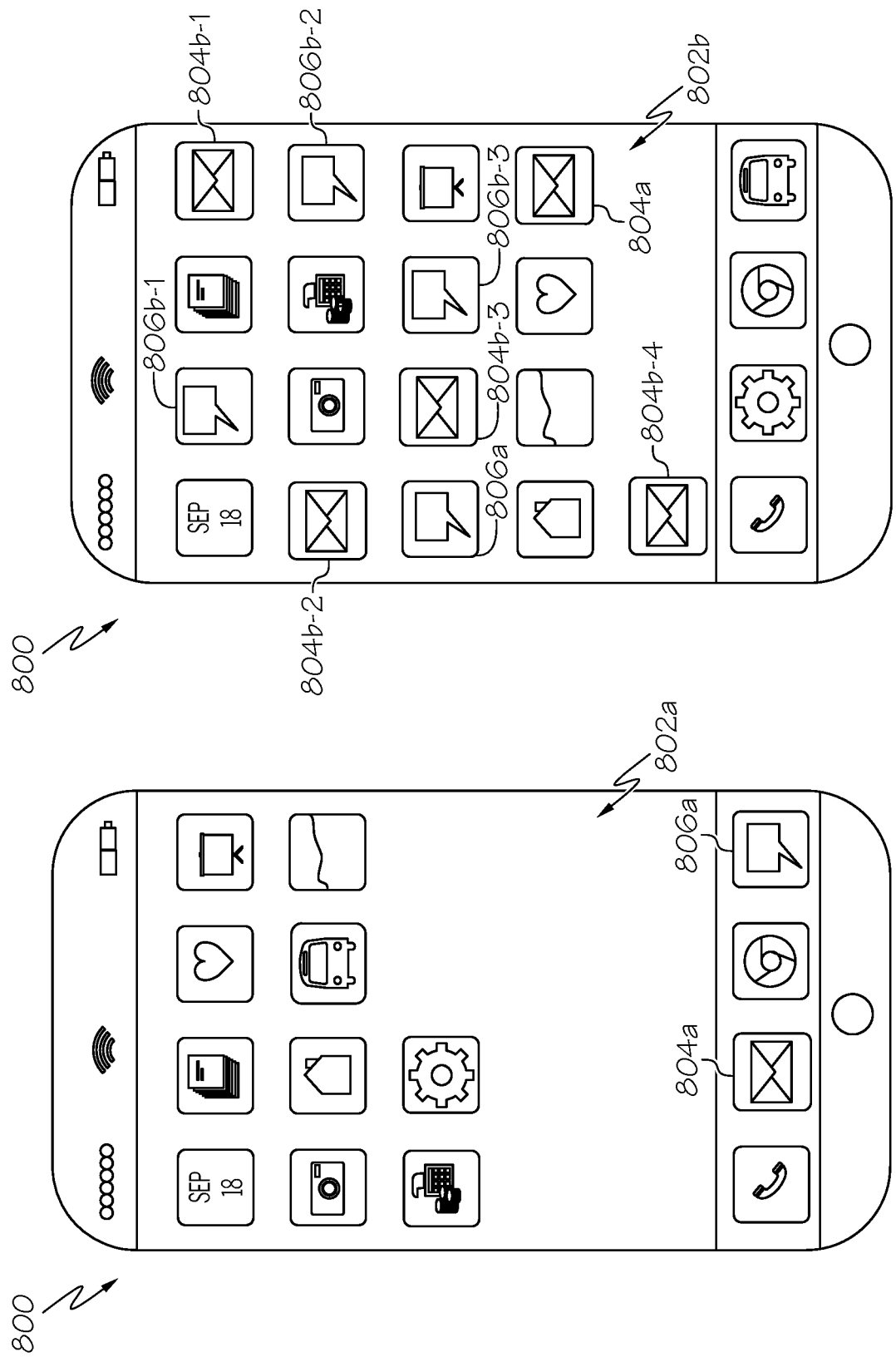

USING DECOY ICONS TO PREVENT UNWANTED USER ACCESS TO APPLICATIONS ON A USER COMPUTING DEVICE

BACKGROUND

The present disclosure relates in general to the field of computer systems, and more specifically, to preventing unwanted user access to applications on a user computing device.

With the ever-increasing sale, production, and deployment of mobile phones and other handheld and mobile computing devices, consumers and users have come to rely on nearly constant access to their personal mobile computing devices. A wide variety of mobile applications are now available that enhance and contribute to numerous aspects of life such as medical, financial, family, relationship, and work aspects, for example. Thus, the increased availability of mobile computing devices and selection of mobile applications has given rise to significant amounts of personal data being stored, viewed, and accessed on personal mobile computing devices. A user of a personal mobile computing device may try to prevent unwanted access to some or all of the personal (or other) information stored and/or accessed by mobile applications on the user's mobile computing device. For example, both unauthorized users and guest users of a mobile computing device may present risks that a user's personal information will be revealed. Such security concerns have emerged from the paradigm shift introduced through the development and widespread use of mobile user computing devices and mobile applications.

BRIEF SUMMARY

According to one aspect of the present disclosure, a menu of icons can be generated including an application icon and a decoy icon that correspond to a mobile application in a mobile device. The application icon may be assigned to a first location in the menu of icons and the decoy icon may be assigned to a second location in the menu of icons. Icon location information may be communicated to the mobile application. The menu of icons may be provided for display on a display screen of the mobile device. A first indication of user input to select the decoy icon in the menu of icons may be received. The mobile application may be invoked based on the decoy icon being selected. Second location information indicating the second location in the menu of icons may be communicated to the mobile application.

BRIEF DESCRIPTION OF THE DRAWINGS

FIGS. 8A-8B are example screenshots of a display screen of a user computing device illustrating screenshots before and after decoy icons are enabled.

Like reference numbers and designations in the various drawings indicate like elements.

DETAILED DESCRIPTION

Figure 1:
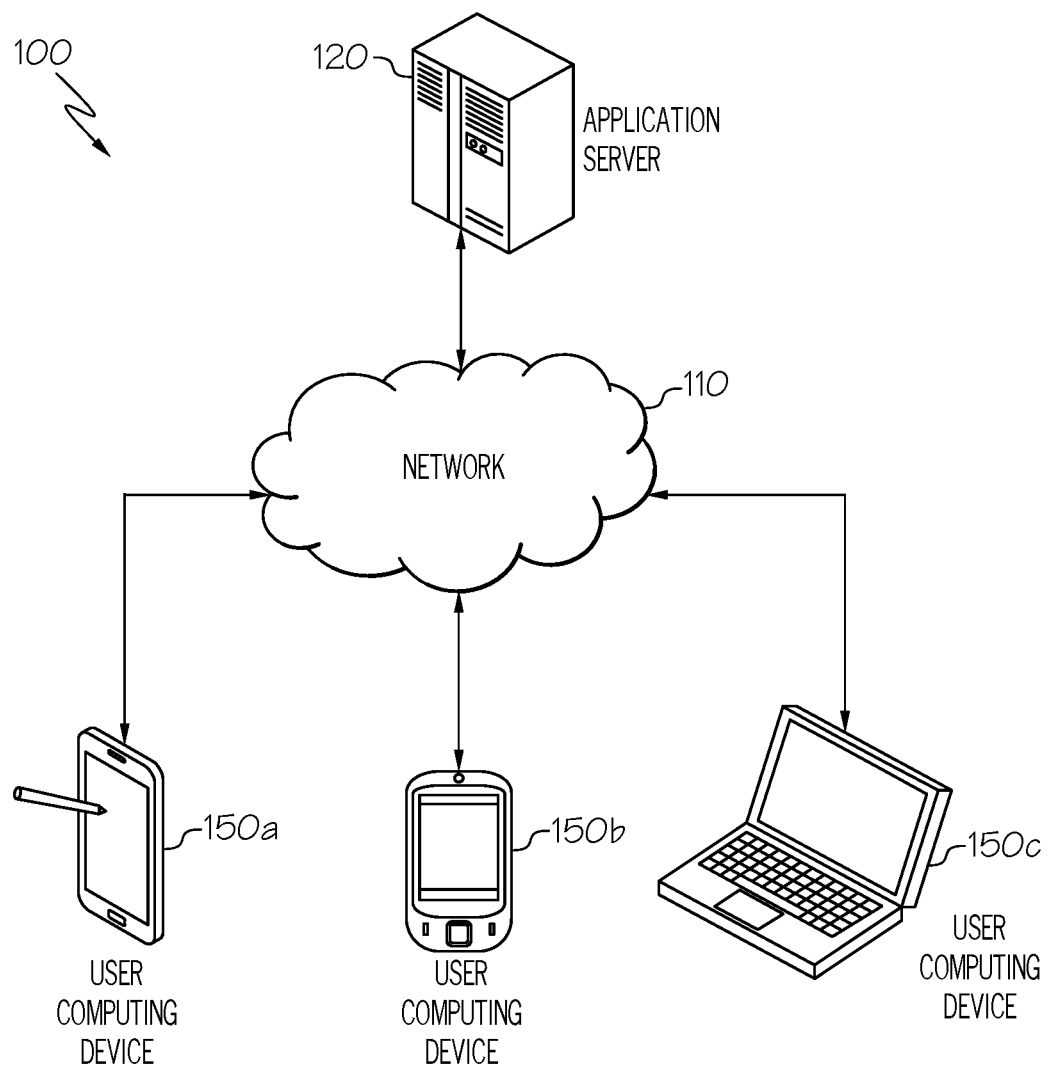
FIG. 1 is a simplified schematic diagram of an example computing environment including an example user computing device.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "logic," "unit," "element," "component," "manager," "generator," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program, including code and/or logic, for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user computing device, partly on a user computing device, as a stand-alone software package, partly on a user computing device and partly on a remote computer, or entirely on the remote computer or server. In the latter scenario, the remote computer may be connected to the user computing device through any type of network, including a local area network (LAN) or a wide area network (WAN), including a cellular network, or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions or code. These computer program instructions or code may be provided to a processor of a general purpose computer, special purpose computer, or other programmable data processing apparatus to produce a machine, such that the instructions or code, which execute via the processor of the computer or other programmable instruction execution apparatus, create a mechanism for implementing the functions/acts specified in the flowchart and/or block diagram block or blocks.

These computer program instructions or code may also be stored in a computer readable medium that when executed can direct a computer, other programmable data processing apparatus, or other devices to function in a particular manner, such that the instructions or code when stored in the computer readable medium produce an article of manufacture including instructions or code that, when executed, cause a computer to implement the function/act specified in the flowchart and/or block diagram block or blocks. The computer program instructions or code may also be loaded onto a computer, other programmable instruction execution apparatus, or other devices to cause a series of operations to be performed on the computer, other programmable apparatuses, or other devices, to produce a computer implemented process such that the instructions or code, which execute on the computer or other programmable apparatus, provide processes for implementing the functions/acts specified in the flowchart and/or block diagram block or blocks.

FIG. 1 illustrates a simplified schematic diagram of an example computing environment 100. Embodiments of computing environment 100 may include functionality to prevent unwanted user access to selected applications on a user computing device (e.g., 150a, 150b, 150c, etc.). Such protection is desirable as the user computing device may have applications that store (or have access to) data and other information that is considered personal, confidential, sensitive, or otherwise private by the authorized user. Although guest login credentials may be configured on some user computing devices to allow controlled access to a device, this technique often remains untouched. Moreover, even when guest credentials are configured, an authorized user may avoid asking certain persons (e.g., friends, relatives, co-workers, bosses, etc.) to use those credentials when accessing their user computing device, because such a request may imply a lack of trust in or suspicion of the guest user. Thus, a typical authorized user may allow guest users (e.g., friend, spouse, child, etc.) to access their personal device even though the device contains certain applications with information that the authorized user does not want to be accessible to the guest user. For example, a social media app, a dating app, a health app, a financial app, or a mail app may contain sensitive or private information that an authorized user does not want to be viewed by a guest user.

A user computing device (e.g., 150a, 150b, 150c, etc.), as shown in FIG. 1, may be configured to resolve these issues. In an embodiment, one or more applications on the user computing device may be selected and configured by the authorized user of the device, such as the owner or other legitimate user, to prevent unwanted access to the applications by an unauthorized or guest user who has possession of the device. A trap service manager implemented on the user computing device can be used to configure decoy icons for any applications that are implemented with one or more trap applications. Decoy icons can prevent an attack by an unauthorized user (e.g., a guest user, a malicious user) by deceiving the unauthorized user into believing that a decoy icon displayed in menu of icons on a display screen of the device represents a legitimate application, and that accessing the apparent legitimate application will render desired information (e.g., personal information associated with the authorized user of the device). If the unauthorized user attempts to access the application by selecting the decoy icon, a backend process, referred to herein as a 'trap application' on the device can take some action to stop the possible attack.

In at least one embodiment, a trap application is implemented as a function of the application. In one example, a trap application can include a lockout function that locks the user computing device from further access. Authentication of the authorized user's credentials may be required to unlock the device. In another example, a trap application may generate and provide for display a simulation of display images associated with the selected application. A display image may be a page displayed in a graphical user interface in some embodiments, and can include one or more of (but is not necessarily limited to) image content, text content, and icons or hyperlinks (or other references) to render a different display image or to access a data storage location. In this embodiment, however, the simulated display images may present at least some alternative data, which could include sham data, fake content, or any other data that does not reveal the real data used by the core of the selected application and that is intended to deceive the current user. In some implementations, alternative data may be stored on the user computing device. In other implementations, an application server (e.g. 120) may be accessed by the trap application to obtain alternative data to populate a simulated display image. In some implementations, the trap application may allow some user input and respond with other simulated display images and/or additional alternative data.

In at least one embodiment, decoy icons created for an application may be implemented as shortcuts that are each a visual replica of an application icon associated with the application. An application icon, when selected from a display screen of the user computing device, can invoke the application to be executed normally to perform the intended functions of the application (e.g., by executing a core application). Each application can be associated with its own unique application icon. Decoy icons of an application may be configured as shortcuts that invoke the application, which can be configured to execute particular functions in the application, such as a trap application. In at least one embodiment, because the difference between an application's decoy icons and application icon are not visually perceptible, a current user without a priori knowledge of where the application icon or decoy icons are located in a displayed menu of icons will be unable to tell which icon invokes the application to execute the core application and which icon(s) invoke the application to execute a trap application. Invoking a trap application can include directly calling the trap application or causing the application to call the trap application.

Embodiments of a user computing device (e.g., 150a, 150b, 150c, etc.), as disclosed herein, provide several advantages. Embodiments can enable an authorized user to avoid awkward and/or undesirable exchanges with others who the authorized user allows to access the authorized user's device. Embodiments herein enable an authorized user to allow a friend, spouse, child, etc., to use or borrow the authorized user's device (which is referred to herein as being a 'guest user') while minimizing the risk of exposing personal data that is accessible through certain applications on the device. Embodiments disclosed herein allow a guest user to access unprotected applications and functionality on a device (e.g., phone calling, Internet access, etc.), while deceptive techniques implemented on the device and unknown to the guest user help prevent the guest user from having unfettered access to all available applications and functionality. The deceptive techniques can also help prevent other unauthorized users (e.g., when the device has been stolen or found by a malicious user) from gaining access to applications that reveal the authorized user's private information and any other applications the authorized user wants to protect. Furthermore, the authorized user can select which applications to protect and may configure parameters that control how the protection is implemented for each application to be protected.

With reference to various elements of FIG. 1, a description of the infrastructure of computing environment 100 is now provided. Generally, computing environment 100 can include any type or topology of networks. Within the context of the disclosure, networks such as network 110, represent a series of points or nodes of interconnected communication paths for receiving and transmitting packets of information that propagate through computing environment 100. A network, such as network 110, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof. Additionally, radio signal communications over a cellular network may also be provided in computing environment 100. Suitable interfaces and infrastructure may be provided to enable communication with the cellular network.

Communications in computing environment 100 may be inclusive of packets, messages, requests, responses, replies, queries, etc. Communications may be sent and received according to any suitable communication messaging protocols, including protocols that allow for the transmission and/or reception of packets in a network. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Particular messaging protocols may be implemented in computing environment 100 where appropriate and based on particular needs. Additionally, the term 'information' and 'data' as used herein, refers to any type of binary, numeric, voice, video, textual, multimedia, rich text file format, HTML, portable document format (pdf), or script data, or any type of source or object code, or any other suitable information or data in any appropriate format that may be communicated from one point to another in electronic devices (e.g., user computing devices 150a, 150b, 150c, application server 120, etc.) and/or networks.

In general, "servers," "computing devices," "computing systems," "network elements," "systems," "services," "hosts," "devices," "networks," etc. (e.g., 120, 150a, 150b, 150c, etc.) in example computing environment 100, can include electronic computing devices or systems operable to receive, transmit, process, store, or manage data and information associated with computing environment 100. As used in this document, the terms "computer," "processor," "processor device," and "processing element" are intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and/or proprietary operating systems.

Further, elements of computing environment 100 (e.g., 120, 150a, 150b, 150c, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, application server 120 can be at least partially (or wholly) cloud-implemented, web-based, or distributed to remotely host, serve, or otherwise manage data, software services and applications interfacing, coordinating with, dependent on, or used by user computing devices 150a-150c in computing environment 100. In some instances, a server, system, subsystem, and/or computing device can be implemented as some combination of devices that can be hosted on a common computing system, server, server pool, or cloud computing environment and share computing resources, including shared memory, processors, and interfaces.

Figure 2:
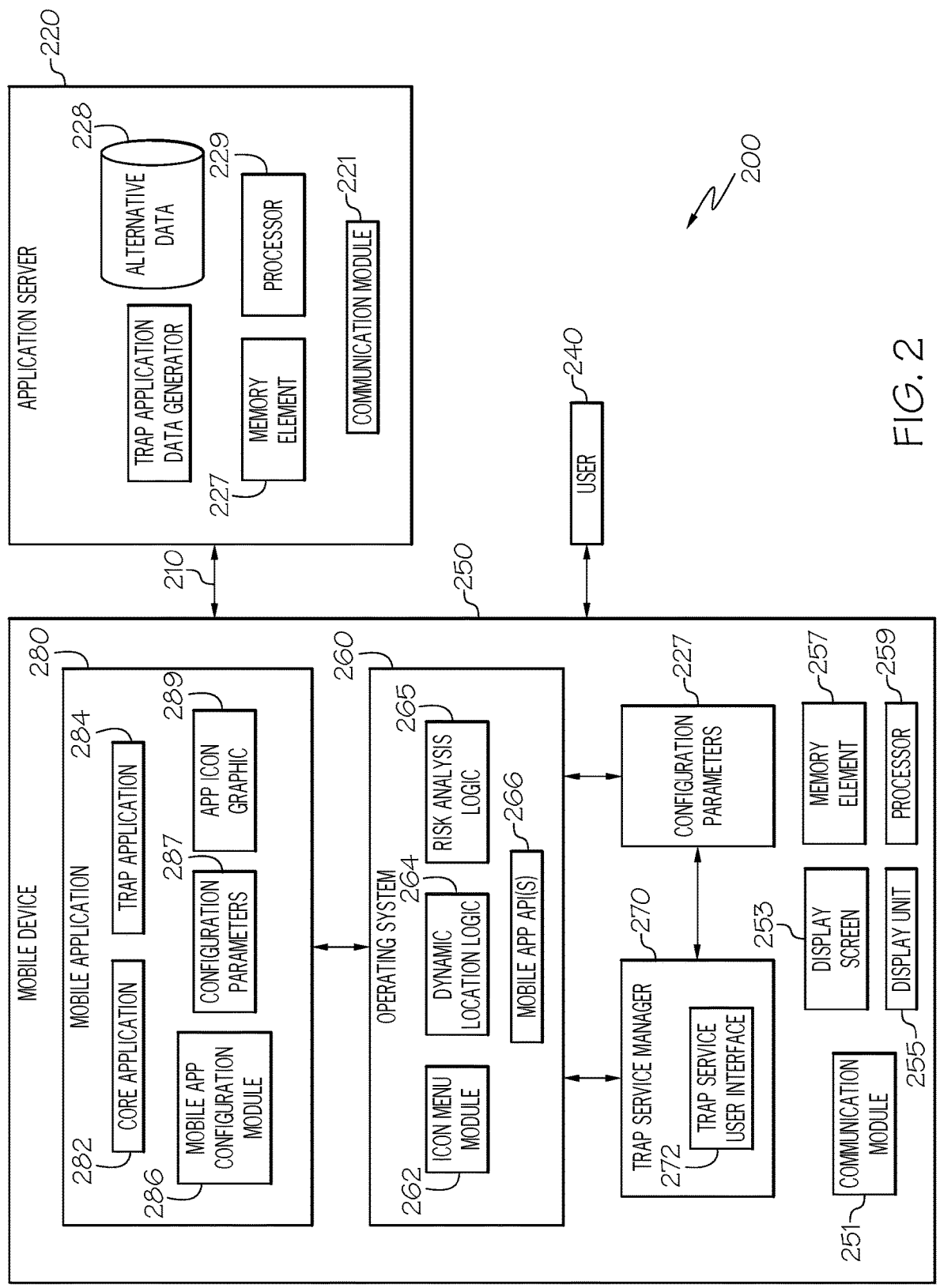
FIG. 2 is a simplified block diagram of an example software system including a user computing device implementing a trap service in accordance with at least one embodiment.

Turning to FIG. 2, a simplified block diagram is illustrated of an example computing system 200 including a mobile device 250, an application server 220, and a user 240. Mobile device 250 represents an example of user computing devices 150a, 150b, or 150c, and application server 220 represents an example of application server 120. Mobile device 250 and application server 220 are configured with respective components to address issues and implement trap service features to protect applications and associated data through deception, as introduced above.

Mobile device 250 may be any mobile computing device including, but not limited to, a smart phone, wearable computer, portable gaming console, portable multimedia device, Internet of Things (IoT) device, or other device. Mobile device 250 may include one or more data processing apparatuses, such as processor 259, one or more computer-readable memory elements 257, and other components (e.g., 260, 270, 280, 251, etc.) implemented in hardware and/or machine-executable code stored in memory elements 257 and executable by the one or more data processing apparatuses. Mobile device 250 may additionally include one or more presentation devices, such as a display unit 255 and a display screen 253, whereon graphical user interfaces may be displayed including a trap service user interface 272. In some implementations, presentation devices (e.g., 255, 253) may include an audio presentation module and speakers to present messages audibly instead of or in addition to graphical presentations, among other examples. Display screen 253 may include a touch-screen with touch detection and processing circuitry to detect and process user-input via a human finger or suitable touch device (e.g., stylus). Further, a communication module 252 may be provided to enable the device 250 (and its respective programs (e.g., operating system 260, core application 282, trap applications 284, trap service manager 270, etc.)) to communicate with one or more other systems (e.g., 220, etc.) over one or more networks (e.g., 210).

An operating system 260 may be provided on mobile device 250 to orchestrate functionality of the device and provide an interface between software and hardware of the device. In some embodiments, operating system 260 may be integrated with, or otherwise cooperate with, a trap service manager 270, which enables user configuration of the trap service for a mobile application. Trap service manager 270 may provide a settings page for the operating system, as indicated by trap service user interface 272, through which an authorized user may select and enable trap application functionality for one or more mobile applications on the device. Additionally, trap service user interface 272 may also allow the user to add, delete, or edit one or more configuration parameters 277 related to the trap service. Configuration parameters 277 for a particular mobile application may include, but are not necessarily limited to, the number of decoy icons to be displayed for the mobile application, the location of the application icon (i.e., the icon that, when selected by a user, invokes the mobile application, which executes its core functions based on the application icon being selected) in the menu of icons, the location(s) of the decoy icon(s) in the menu of icons, time frames related to the display and location of the application icon and/or the decoy icon(s) for the mobile application (e.g., time frames during which the application icon is to be displayed in a particular location in the icon menu, time frames during which the decoy icons are to be displayed, etc.), the particular trap application to be performed for the decoy icon(s) (e.g., lockout function, simulated display image with alternative data, etc.), or any suitable combination thereof.

Operating system 260 also may include an icon menu module 262, dynamic location logic 264, risk analysis logic 265, and one or more mobile app application programming interfaces (APIs) 266. Icon menu module 262 can include functionality typically provided by an operating system of a mobile device to generate a menu of icons corresponding to the mobile applications on the device and to provide the menu of icons for display on a display screen (e.g., 253) of the mobile device. Dynamic location logic 264 may be provisioned in operating system 260 to identify which mobile applications have one or more trap applications enabled, and to dynamically determine locations in a menu of icons to which decoy icons and application icons are to be assigned for each enabled mobile application. Determining the locations of decoy icon(s) and an application icon of a mobile application can be based, at least in part, on configuration parameters 277 associated with the mobile application. Also, in at least some embodiments, the menu of icons may include multiple application icons, but not all application icons necessarily correspond to decoy icons. For example, decoy icons may not be created for a phone service with a phone service application icon because the authorized user may not be concerned about protecting the phone service from access by a guest user.

Operating system 260 may also be provisioned with one or more mobile app APIs (e.g., 266) that are exposed to communicate with mobile apps, such as mobile application 280, to support the trap application functionality. Mobile app API 266 may be configured to enable communication between a mobile application with trap application functionality (e.g., 280) and an operating system (e.g., 260). The mobile application can notify the operating system that the mobile application is implemented with one or more trap applications, such as trap application 284. The mobile application can also provide information to the operating system via mobile app API 266 that indicates the appropriate response when a current user selects one of the mobile application's corresponding decoy icons from the menu of icons. For example, in some implementations, user input to select a decoy icon may directly invoke the trap application logic of the mobile application. In other implementations, user input to select a decoy icon of the mobile application may invoke the mobile application, which may be modified to determine whether the selected icon is a decoy icon or an application icon and to run the appropriate trap application if the selected icon is a decoy icon.

In at least one embodiment, operating system 260 may also be configured to perform risk analysis of user activities related to decoy icons. For example, risk analysis logic 265 may be tightly integrated with operating system 260 to perform various risk analysis. One example includes determining risk based on whether a user of mobile device 250 has unlocked the device with user credentials in a first, second, or third attempt. Post-login analysis can include, but is not necessarily limited to, determining risk based on whether a decoy icon has been selected, the total number of times a decoy icon has been selected within a particular login session or any other defined time frame (e.g., hour, day, etc.), the interval between decoy icons being selected, how the currently-authenticated user logged on to the mobile device, location (e.g., geo-location) of the mobile device when the current user session was authenticated, location (e.g., geo-location) of the mobile device when the decoy icon was selected, actions taken prior to the selection of the decoy icon, etc. and any combination thereof.

Mobile device 250 may be configured with any number of mobile applications, such as mobile application 280, each of which is implemented with its own trap application functionality, such as trap application 284. Mobile device 250 may also be provisioned with other mobile applications (not shown) that are not implemented with trap application functionality. In such scenarios, mobile app API 266 may not receive valid communications from the other applications and therefore, operating system 260 understands that those other applications are not implemented with a trap application. As a result, trap service manager 270 may not allow enablement or configuration of trap service functionality for any applications that are not implemented with one or more trap applications. However, trap application functionality could be enabled for any one or more of the mobile applications that are implemented with one or more trap applications (e.g., 284).

Mobile application 280 can include core application 282 and trap application 284. Core application 282 can include code, which may include logic and/or instructions, that performs operations to achieve the intended purpose of the mobile application. For example, the core application of a messaging application could perform operations to achieve messaging functions such as displaying recent messages received by the authorized user of the mobile device. In another example, the core application of a dating application could perform operations to achieve dating connections such as displaying pictures and contact information of available men or women meeting the criteria of the authorized user of the mobile device.

Trap application 284 of mobile application 280 can include code, which may include logic and/or instructions, that performs operations to prevent unauthorized access to the core application 282 in response to receiving an indication of user input to select a decoy icon associated with the mobile application. An authorized user would presumably not select a decoy icon because the authorized user would know, a priori, where the application icon and/or the decoy icons are located in the menu of icons. Thus, user selection of a decoy icon is, presumptively, performed by a user that is not authorized to access the mobile application indicated by the decoy icon.

Trap application 284 may be configured to perform any desired action to prevent access to core application 282. Preventing access to core application 282 protects personal, confidential, sensitive and/or otherwise private data used by the mobile application from being revealed via the display screen of the mobile device. One example action to prevent access to the core application is to perform a lockout function that shuts down the mobile device or otherwise locks the screen of the mobile device until appropriate actions are taken to unlock the mobile device (e.g., user credentials are provided to the mobile device and authenticated, a code is provided via another communication mechanism such as email and successfully entered into the mobile device, etc.).

Another example action to prevent access to the core application includes generating a simulation of a display image associated with the mobile application and populating the simulated display image with alternative data. In one implementation, the alternative data may be stored on mobile device 250 and retrieved when the trap application is called. In another implementation, trap application 284 may access the mobile application's associated application server (e.g., 220). A trap application data generator 222 may obtain alternative data 228 to be provided to trap application 284 for populating the simulated display image. In certain implementations, some legitimate data that is used by core application 282 of the mobile application may be used to help populate the simulated display image. However, such data may be used to provide an appearance of legitimacy (e.g., a name of the authorized user, date of birth of the authorized user, a geo-location of the mobile device, etc.), along with other alternative data that in order to deceive the current user that selected the decoy icon. In some embodiments, certain functionality or information in a simulation may be omitted entirely (e.g., contents of chats or text messages, etc.). In some implementations, trap application 284 may be configured to allow the user to interact with the simulated display image and, responsive to the user input, provide additional alternative data and/or additional simulated display images.

Mobile application 280 also includes application icon graphic 289, which is unique to mobile application 280. Other mobile applications may have their own unique application icon graphics. Mobile application 280 can provide its application icon graphic 289 to operating system 260 to enable the operating system to generate a menu of icons including an application icon (using application icon graphic 289), which provides a shortcut to mobile application 280. Typically, an application icon is a pictogram or ideogram that can be displayed on a display screen of a user computing device to allow a user to navigate available applications and services on the device. Decoy icons of mobile application 280 can use the same application icon graphic 289, with a shortcut to mobile application 280. In at least one embodiment, mobile application 280 can have a priori knowledge of the location of its corresponding application icon and decoy icon(s) in the icon menu. Accordingly, the location of a user-selected icon can be communicated to mobile application 280 to enable the mobile application to differentiate between user input to select the application icon and user input to select a decoy icon. Mobile application 280 can then take appropriate action based on the type of icon that was selected by the user.

In other embodiments, a decoy icon may be configured as a shortcut that links directly to a particular trap application of mobile application 280. In this implementation, upon the selection of a decoy icon by a user, trap application 284 may be called to perform a lockout function or to display a simulated display image populated with at least some alternative data. Additionally, different decoy icons of the same mobile application can link to the same or different trap applications of the mobile application. Thus, in at least some embodiments, different decoy icons of the same mobile application can cause the same actions to be performed regardless of which decoy icon is selected. In at least some other embodiments, different decoy icons of the same mobile application can cause different actions to be performed when a user selects a decoy icon.

In some examples, mobile application 280 may also be configured with mobile app configuration module 286 and configuration parameters 287. In this example, mobile app configuration module 286 may provide a settings page for the mobile application, through which a user may enable trap application 284 for the mobile application 280. Additionally, mobile app configuration module 286 may also allow the user to add, delete, or edit one or more configuration parameters 287 related to the trap service, as previously described herein. These configuration parameters 287 may then be provided to operating system 260 to enable the icon menu module and dynamic location logic to properly generate a menu of icons in accordance with configuration parameters 287 of mobile application 280. In further embodiments, all of the trap service functionality may be implemented in a mobile application, such as mobile application 280, without modifying an operating system of a device on which the mobile application is installed. In this embodiment, multiple applications may be bundled together as a single installable to achieve the trap service functionality described herein.

In at least one embodiment, application server 220 may be communicably coupled to user computing device 250 via a network (e.g., 210). Application server 220 may be a server, a server pool, or any other suitable network element or computing device associated with one or more mobile applications, such as mobile application 280, on device 250. Application server 220 may include one or more data processing apparatuses, such as processor 229, one or more computer-readable memory elements 227, and other components (e.g., 221, 222, 228) implemented in hardware and/or machine-executable code stored in the memory elements 227, and executable and/or read/writeable by the one or more data processing apparatuses 229. Further, a communication module 221 may be provided to enable application server 220 (and its respective programs such as trap application data generator 222) to communicate with one or more other systems (e.g., 250, etc.) over one or more networks (e.g., 210).

While FIG. 2 is described as containing or being associated with a plurality of elements, not all elements illustrated within computing environment 200 of FIG. 2 may be utilized in each alternative implementation of the present disclosure. Additionally, one or more of the elements described in connection with the examples of FIG. 2 may be located externally to computing environment 100, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 3:
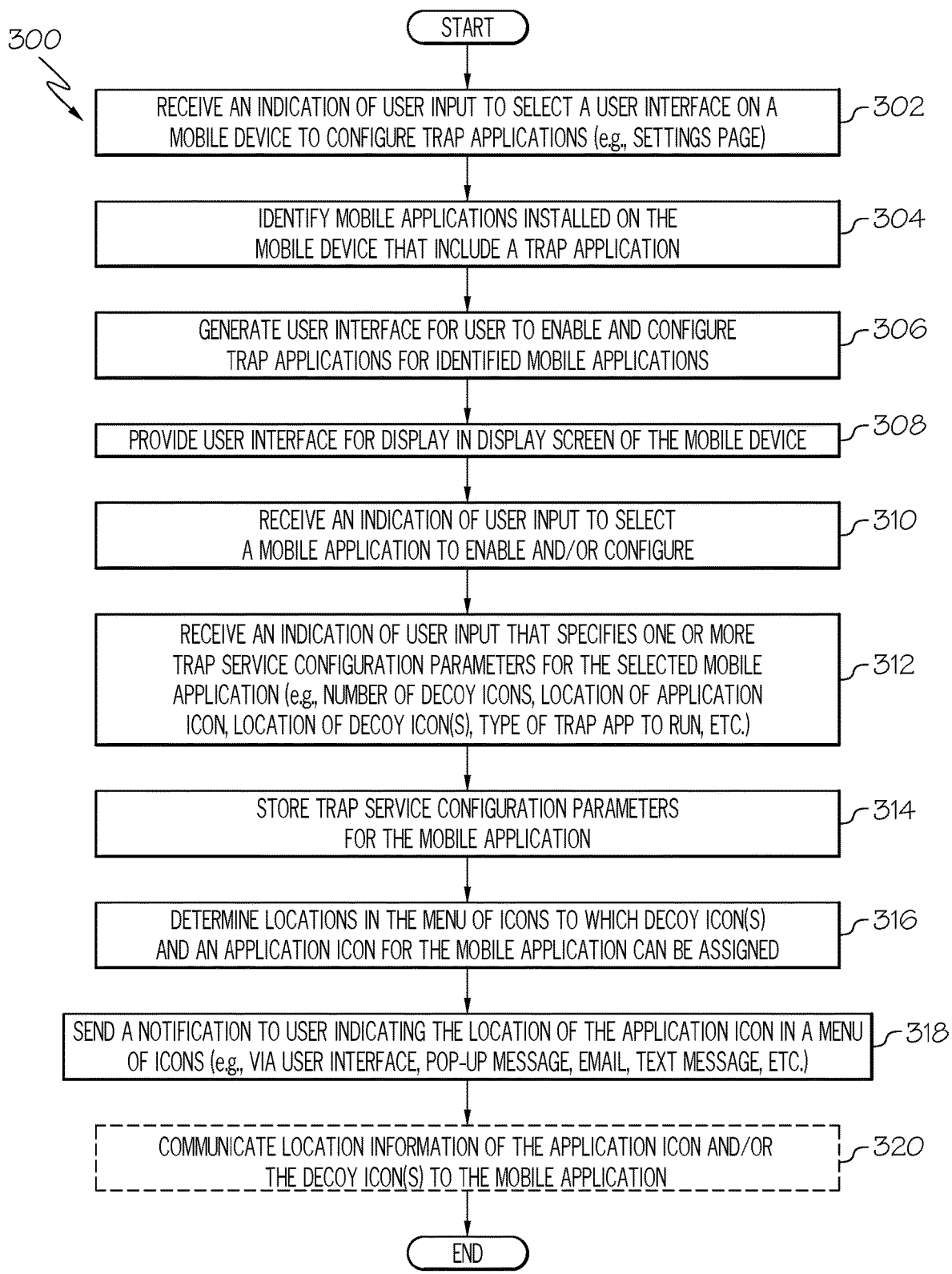
FIG. 3 is a simplified flowchart illustrating potential operations associated with enabling a trap application and decoy icon on a user computing device.

Turning to FIG. 3, a simplified flowchart 300 is shown illustrating techniques of protecting selected applications on a user computing device, such as mobile device 250. In at least one embodiment, one or more sets of operations correspond to activities of FIG. 3. Mobile device 250, or portions thereof, may utilize the one or more sets of operations. Mobile device 250 may comprise means such as processor 259, for performing the operations. In an embodiment, at least some operations of 300 may be performed by a trap service manager (e.g., 270) and an operating system (e.g., 260).

At 302, mobile device 250 receives an indication of user input to select a user interface (e.g., settings page) to configure trap applications of mobile applications on the mobile device. At 304, trap service manager 270 identifies mobile applications installed on the mobile device that include at least one trap application, such as trap application 284. In at least one embodiment, the operating system receives a notification (e.g., via mobile app API 266) from each mobile application configured with a trap application. A notification from one of these mobile applications alerts the operating system that the mobile application is configured with a trap application. The operating system can provide decoy icons for any mobile application that provides this notification. In at least one embodiment, trap service manager 270 can identify each mobile application based on the notification received by the operating system. At 306, trap service manager 270 generates a user interface (e.g., 272) for the user to enable and configure trap applications for the identified mobile applications. In at least one embodiment, decoy icons may not be displayed for a mobile application until trap applications are enabled through the operating system, even though the mobile application includes at least one trap application. A 308, the user interface (e.g., settings page) is provided for display in display screen 253 of mobile device 250.

At 310, trap service manager 270 receives an indication of user input to select a mobile application to enable and/or configure. At 312, trap service manager 270 receives an indication of user input that specifies one or more trap service configuration parameters for the selected mobile application. For example, trap service configuration parameters can include, but are not necessarily limited to, a number of decoy icons to be displayed for the mobile application, the location in the icon menu of the application icon for the mobile application, the location in the icon menu of the decoy icons, time frames related to the display and location of the application icon and/or the decoy icon(s) for the mobile application (e.g., time frames during which the application icon is to be displayed in a particular location in the icon menu, time frames during which the decoy icons are to be displayed in particular locations, etc.), the type of trap application to run in response to a user selecting a decoy icon (e.g., lockout function, simulated display image with alternative data, etc.), etc. At 314, trap configuration parameters are stored (e.g., 277).

In some embodiments, after the decoy icons have been configured, at 316, dynamic location logic may determine locations, in the menu of icons, to which decoy icon(s) and the application icon for the mobile application can be assigned. At 318, a notification can be sent to the user to specify the location of the application icon. Thus, the user can know, a priori, where the application icon is to be displayed when a menu of icons is displayed on the mobile device. Thus, this helps the user to avoid inadvertently selecting a decoy icon. The notification can be sent using any suitable communication mechanism including, but not necessarily limited to, a message on the displayed user interface 272, a pop-up message on the display screen, an email, a text message, or a voice message. In some implementations, the notification may also include the location(s) to which the decoy icon(s) are assigned in the menu of icons. Also, in some embodiments, at 320, location information of the application icon and/or the decoy icon(s) is communicated from the operating system to the mobile application to specify the locations of the decoy icon(s) and/or application icon in the menu of icons. The location information may also specify which type of icon (e.g., application or decoy) is assigned to which location. In some implementations, further information may be provided that indicates the type of trap application that is to be executed when a particular decoy icon is selected. In other embodiments, however, this notification may be sent each time dynamic location logic determines the locations prior to displaying the menu of icons.

Figure 4:
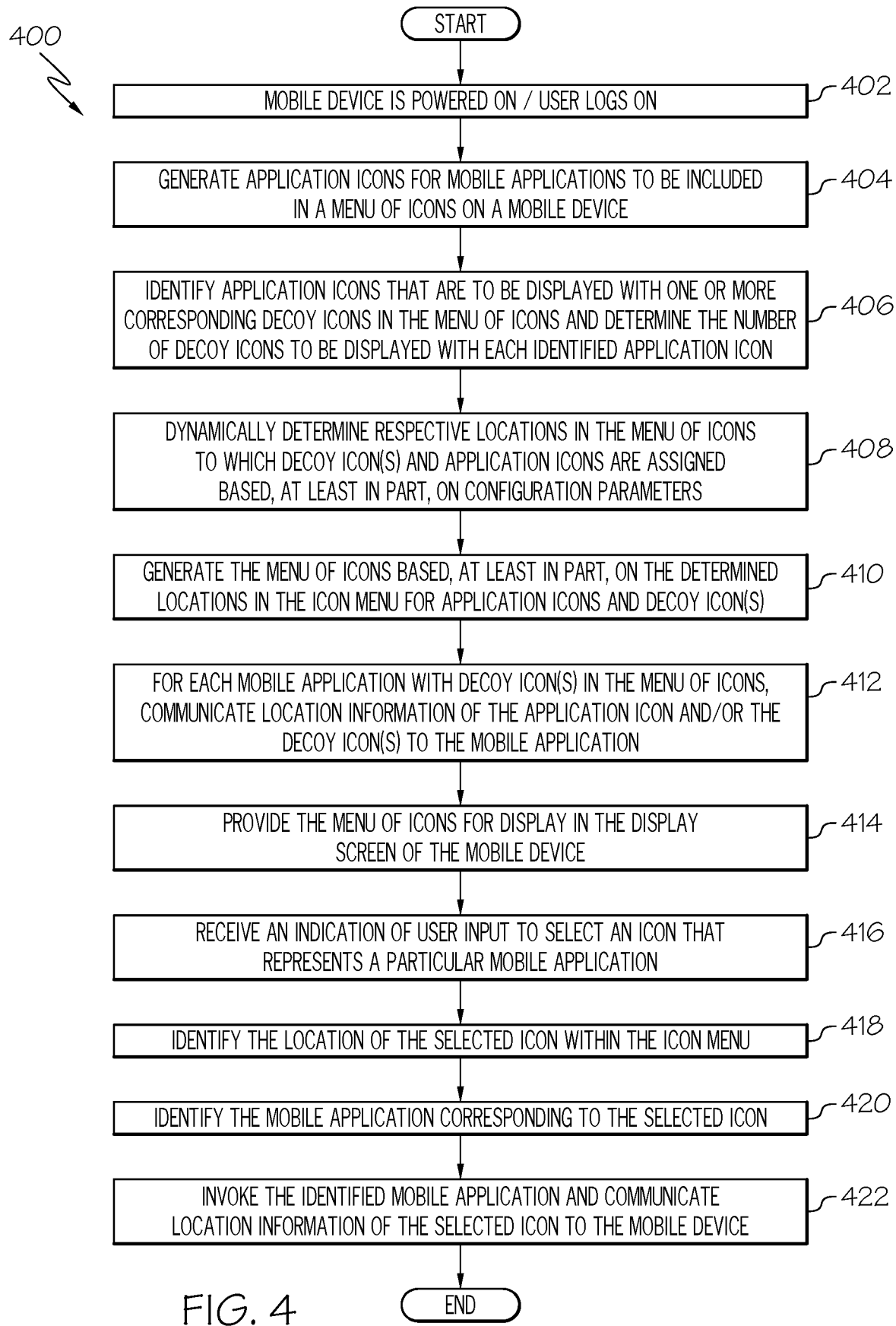
FIG. 4 is a simplified flowchart illustrating further potential operations associated with generating and displaying a menu of icons including a decoy icon on a user computing device.

FIG. 4 illustrates a simplified flowchart 400 of techniques for generating a menu of icons for display on a user computing device, such as mobile device 250. In at least one embodiment, one or more sets of operations correspond to activities of FIG. 4. Mobile device 250, or portions thereof, may utilize the one or more sets of operations. Mobile device 250 may comprise means such as processor 259, for performing the operations. In an embodiment, at least some operations of 400 may be performed by operating system 260 (e.g., dynamic location logic, icon menu module 262, and mobile app API 266).

At 402, mobile device 250 is powered on, or a user logs on. At 404, operating system 260 obtains application icon graphics (e.g., 289) from mobile applications installed on the mobile device, and generates a respective application icon for each mobile application using that mobile application's application icon graphic. In at least one embodiment, each application icon can be configured as a shortcut to its corresponding mobile application.

At 406, operating system 260 identifies application icons that are to be displayed with one or more corresponding decoy icons in a menu of icons. The operating system may also determine the number of decoy icons to be displayed with each identified application icon. In some scenarios, the operating system can determine which trap applications of a particular mobile application are to be called by which decoy icons. For example, three decoy icons of a mobile application may cause, when selected, the execution of a trap application that performs a lockout function, while three other decoy icons of the same mobile application may cause, when selected, the execution of a trap application that generates a simulated display image with alternative data. Appropriate decoy icons for a mobile application (e.g., 280) can be generated by the operating system using the mobile application's application icon graphic (e.g., 289) to configure a shortcut to the mobile application (or directly to the appropriate trap application of the mobile application).

At 408, the operating system dynamically determines respective locations in an icon menu to which decoy icon(s) and application icons are to be assigned. The locations can be dynamically determined based, at least in part, on configuration parameters (e.g., 277 and/or 287). In other embodiments, the locations may be determined by default settings or may be selected randomly. In one non-limiting example, the location of an application icon may be determined based on previously configured configuration parameters or default settings, while the locations of the associated one or more decoy icons may be randomly selected. This example enables prior notification (e.g., at the time of configuration, before a guest user is in possession of the device) to the authorized user regarding the location of that application icon.

At 410, the menu of icons is generated based, at least in part, on the determined locations in the icon menu for the application icons and the decoy icons of the one or more mobile applications with enabled trap applications. Other application icons for mobile applications that are not implemented with trap applications, or that do not have their trap applications enabled, may also be placed in the menu of icons.

At 412, for each mobile application having one or more decoy icons in the icon menu, the mobile app API can communicate location information of the application icon to its corresponding mobile application. In some embodiments, location information may also include information related to the location of the one or more decoy icons. In this embodiment, location information specifies which type of icon (e.g., application or decoy) is assigned to which location. In some implementations, additional information may be provided that indicates the type of trap application that is to be executed when a particular decoy icon is selected. Location information can be provided in any suitable format such as, for example, the page, row, and column corresponding to the particular icon. In other examples, location information could include x-y coordinates of the display screen of the mobile device. In yet other examples, location information could include a page number and sequential number of the icon within the page.

At 414, the menu of icons is provided for display in the display screen of the mobile device. At 416, the operating system receives an indication of user input to select an icon that represents a particular mobile application. At 418, the operating system identifies the location of the selected icon within the icon menu. At 420, the mobile application that corresponds to the selected icon is identified.

At 422, the identified mobile application is invoked and information indicating the location of the selected icon is communicated to the mobile application. Communicating the information that indicates the location of the selected icon, may occur at various times depending on the particular implementation. In one example, the information may be communicated to the mobile application after the first indication of user input is received and the location of the selected icon has been identified (e.g., after 416 and 418), but before the mobile application is invoked (e.g., before 422). In a second example, the information may be communicated to the mobile application after the mobile application is invoked (e.g., after 422). In a third example, the information may be communicated to the mobile application at the time the mobile application is invoked (e.g., during 422).

Mobile app API 266 may be used to communicate the location information from the operating system to the mobile application. This location information of the selected icon can be used by the mobile application to determine whether the selected icon is a decoy icon or an application icon, and to run the appropriate application (e.g., core application or trap application) based on whether the selected icon is a decoy icon or an application icon.

Figure 5:
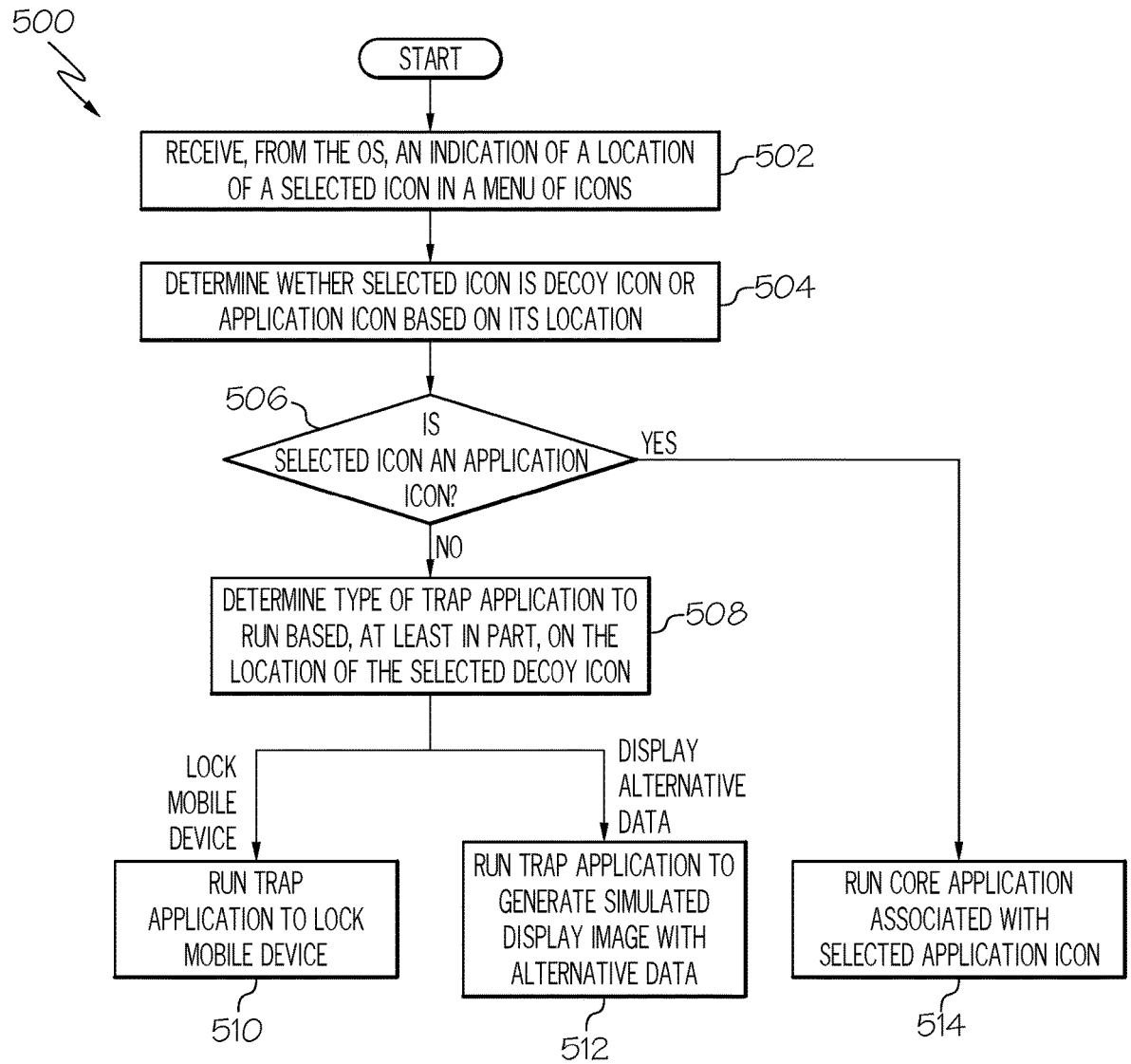
FIG. 5 is a simplified flowchart illustrating further potential operations associated with a mobile application and associated trap application on a user computing device.

FIG. 5 illustrates a simplified flowchart 500 of techniques for protecting selected applications on a user computing device, such as mobile device 250. In at least one embodiment, one or more sets of operations correspond to activities of FIG. 5. Mobile device 250, or portions thereof, may utilize the one or more sets of operations. Mobile device 250 may comprise means such as processor 259, for performing the operations. In an embodiment, at least some operations of flowchart 500 may be performed by a trap application (e.g., 284) in response to an associated decoy icon being selected by a user.

At 502, the mobile application receives, from the operating system, information indicating a location of a selected icon in a menu of icons displayed on the display screen of the mobile device. At 504, the mobile application may determine whether the selected icon is a decoy icon or the application icon, based on the location of the selected icon within the icon menu. If an application icon was selected, as indicated at 506, then at 514, core application 282 associated with the selected application icon is run. In this scenario, the trap application is not executed and thus, the mobile application is run normally by executing the core application without blocking or altering it.

If a decoy icon was selected by the user, as indicated at 506, then the mobile application may be invoked and, based on the decoy icon being selected, the mobile application may execute its enabled trap application. In at least one embodiment, there may be multiple types of trap applications (e.g., perform lockout function, display simulated display image with alternative data, etc.) installed within a single mobile application. In some embodiments different decoy icons associated with the same mobile application may cause different trap applications to execute. An example of this embodiment is shown in operations 508-512. If a decoy icon is selected by a user (i.e., the selected icon is not an application icon), as indicated at 506, then at 508, the mobile application determines a type of trap application to run based, at least in part, on the location of the selected decoy icon. At least one decoy icon may be assigned to a location in the icon menu that is associated with locking the mobile device. In this example, at 510, a trap application may be executed to lock the mobile device. Thus, the current user may not access the mobile device until authentication using appropriate credentials is successful, for example. At least one other decoy icon may be assigned to a location in the icon menu that is associated with simulating the mobile application. In this example, at 512, a trap application may be executed to generate a simulated display image with alternative data. Thus, the current user may be deceived into believing he or she is viewing legitimate information associated with the authorized user and/or mobile device when, in fact, the data is at least partially alternative data.

In other embodiments, all decoy icons of a particular mobile application invoke the mobile application to run a particular trap application of the mobile application. In yet other embodiments, a single type of trap application may be implemented in a mobile application. In these embodiments, if a selected icon is a decoy icon, as determined at 506, then the mobile application may be invoked to run the single enabled trap application for the mobile application. For example, for any decoy icon of a particular mobile application that is selected, the trap application associated with the mobile application may perform a lockout function to lock the mobile device from further use. In another example, for any decoy icon of a particular mobile application that is selected, the trap application associated with the mobile application may provide for display a simulation of a display image associated with the core application and populated, at least partially, with alternative data. It should be appreciated that any other suitable actions may be taken by a trap application as a result of a decoy icon being selected by a user and that the lockout function and simulated display image are merely non-limiting examples.

Figure 6:
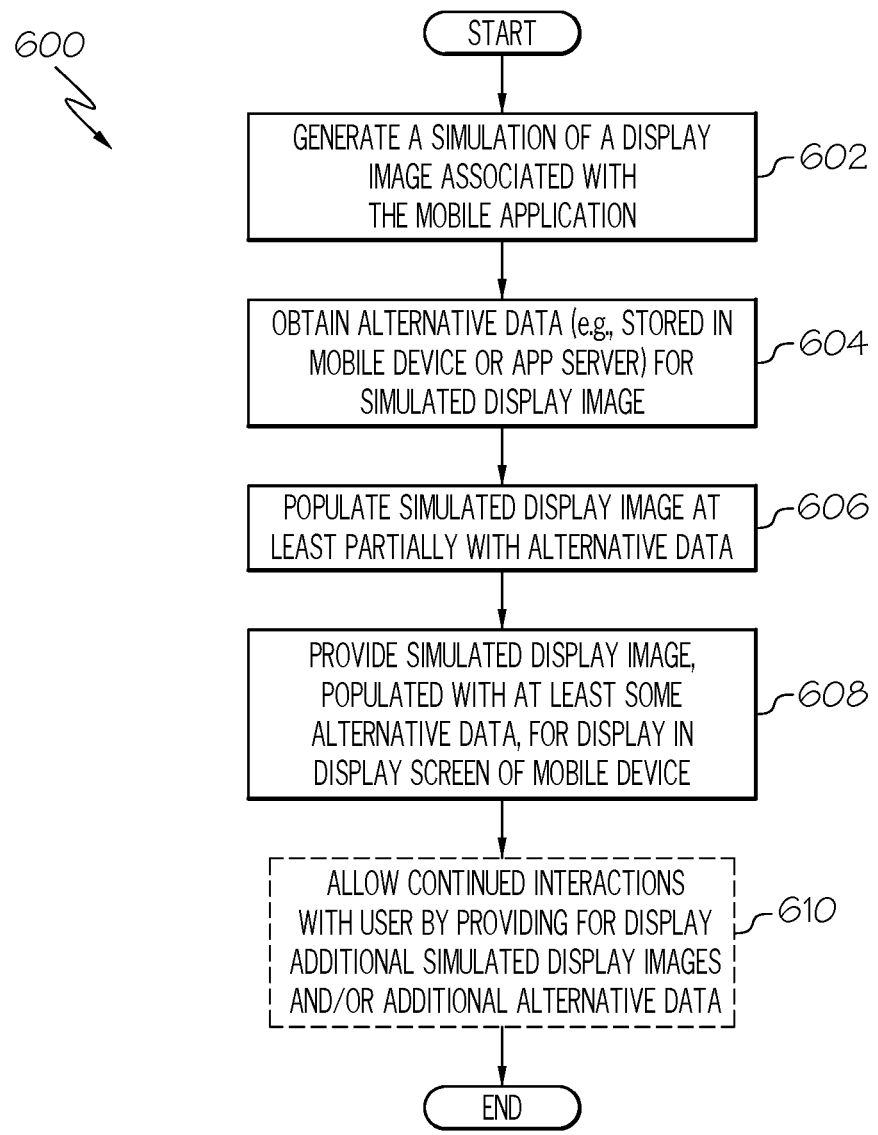
FIG. 6 is a simplified flowchart illustrating further potential operations associated with an example trap application on a user computing device.

FIG. 6 illustrates a simplified flowchart 600 of techniques for deceiving a user attempting to gain access to a protected application on a user computing device, such as mobile device 250. In at least one embodiment, one or more sets of operations correspond to activities of FIG. 6. Mobile device 250, or portions thereof, may utilize the one or more sets of operations. Mobile device 250 may comprise means such as processor 259, for performing the operations. In an embodiment, at least some operations of flowchart 600 may be performed by a trap application (e.g., 284) in response to a decoy icon of a mobile application (e.g., 280) that is associated with application server 220 being selected by a user.

Flowchart 600 illustrates one possible example of operations that may be performed at 512 of FIG. 5. At 602, a simulation of a display image associated with mobile application 280 may be generated. At 604, alternative data for the simulated display image may be obtained. In at least some embodiments, this data is stored in an application server (e.g., 220) associated with the mobile application (e.g., 280). For example, alternative data 228 is an example of this data. In other examples, alternative data may be stored in the mobile device 250 or in some other storage accessible to trap application 284. At 606, the alternative data may be used to at least partially populate the simulated display image. In some embodiments, the simulated display image may be populated entirely with alternative data. In other embodiments, the simulated display image may be partially populated with alternative data and partially populated with real data.

At 608, the simulated display image, populated with at least some alternative data, is provided for display in the display screen of mobile device 250. In some embodiments, the trap application may be configured to allow at least some interaction by the user. In this example, at 610, the trap application allows continued interactions with the user by providing one or more additional simulated display images and/or additional alternative data for display.

Figure 7:
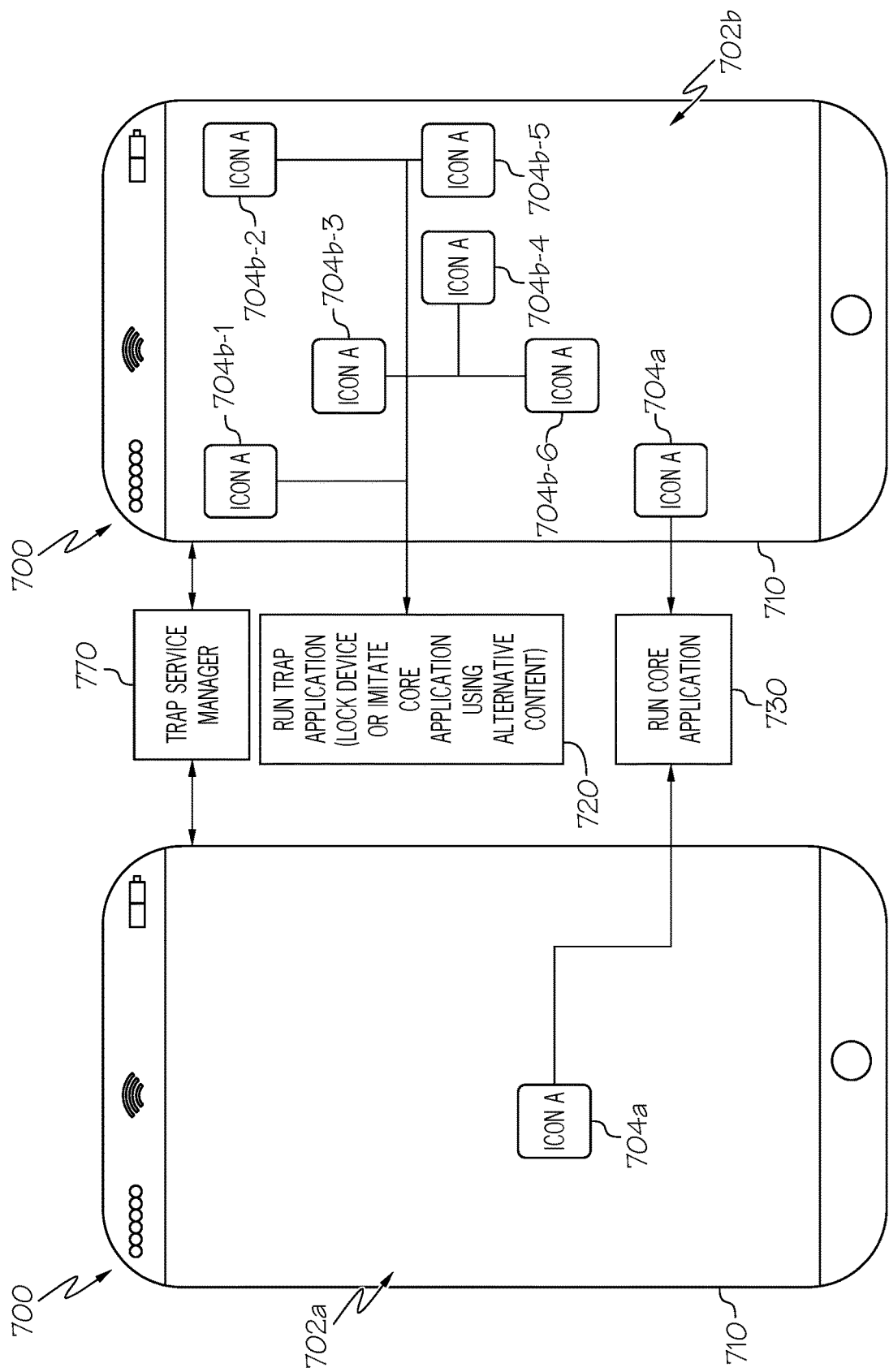
FIG. 7 is a schematic view of a display screen of a user computing device before and after decoy icons are enabled.

FIG. 7 shows schematic views of a display screen 710 of a user computing device, such as mobile device 700 with respective icon menu representations 702a and 702b. The icon menu representations illustrate possible views before (i.e., 702a) and after (i.e., 702b) a mobile application on mobile device 700 is protected using a trap service. In FIG. 7, an application icon of a mobile application is represented by icon 704a. Application icon 704a is shown in icon menu representation 702a prior to a trap application being enabled on the mobile device, for example, via trap service manager 770. Application icon 704a is also shown in icon menu representation 702b after a trap application of the mobile application has been enabled. When a user selects application icon 704a, either before or after a trap application is enabled for the mobile application, the mobile application is opened and executes the core application.

Trap service manager 770 may be used to create decoy icons for the mobile application, which are represented by icons 704b-1, 704b-2, 704b-3, 704b-4, 704b-5, and 704b-6 in icon menu representation 702b. When a user selects one of the decoy icons 704b-1 through 704b-6, the enabled trap application is executed, as indicated at 720. The trap application may perform a lockout function to lock the mobile device, may simulate the core application with a simulated display image populated at least partially with alternative data, or may perform any other suitable function to deceive the current user or block the current user's actions.

The locations of the decoy icons and/or the application icon may be dynamically determined. In at least one embodiment, the location of the decoy icons and/or the application icon of the mobile application may be dynamically determined each time mobile device 700 powers on, each time a user logs in (e.g., uses appropriate authentication to unlock the phone), or each time the menu of icons is re-displayed during an authenticated session. In at least one embodiment, the location of the application icon is determined based on configuration parameters (or default parameters) that provide a fixed location for the application icon, which may be defined by a suitable time frame (e.g., period of time, time of day, day, week, etc.). In other embodiments, the application icon may be dynamically assigned to a random location in the menu of icons. The locations of the decoy icons may be dynamically assigned to random locations or to locations based on configuration parameters, which may be defined by a suitable time frame (e.g., period of time, day, week, etc.) in at least some embodiments.

The authorized user may be notified of the assigned location of the application icon in the icon menu. In one embodiment, the notification may be provided via the mobile device (e.g., text message, pop-up notifications, trap service user interface, etc.) at the time of enablement and configuration of the trap service for the mobile application and/or based on valid authentication credentials being presented (e.g., successful login, etc.). If the application icon's location subsequently changes (e.g., based on configuration parameters indicating another location during a different time frame, based on configuration parameters requiring the location to be randomly assigned at different times, etc.), then the notification may be provided in a manner that does not enable a guest user to become aware of which location is assigned to the application icon versus the decoy icons. For example, such information could be communicated to the authorized user via a different mobile device, a landline telephone, a secondary email that is not downloaded to the mobile device, etc. In some embodiments, the locations of the decoy icons may also be provided to the authorized user. In this embodiment, the notification may be provided in the same or similar manner as the notification for the application icon.

Turning to FIGS. 8A-8B, FIGS. 8A-8B illustrate example screenshots (e.g., 802a and 802b) of a graphical user interface displayed on a display screen 810 of an example user computing device, such as mobile device 800. In this example, mobile device 800 is implemented with a trap service manager, in addition to mail and messaging mobile applications that each include at least one trap application. The screenshots illustrate possible views before and after the mail application and the text messaging application on mobile device 800 are protected using a trap service to enable four decoy icons and associated trap application(s) for the mail application and three decoy icons and associated trap application(s) for the text messaging application.

An application icon for the mail application is represented by icon 804a and an application icon for the text messaging application is represented by icon 806a. Application icons 804a and 806a are shown in screenshot 802a prior to a trap application being enabled on the mobile device, for example, via a trap service manager (e.g., 270, 770). Application icons 804a and 806a are also shown in screenshot 802b after respective trap applications of their mobile applications have been enabled. When a user selects application icon 804a either before or after a trap application is enabled for the mail application, the mail application is opened and executes the core application such that the intended function of the mail application is performed. When a user selects application icon 806a either before or after a trap application is enabled for the text messaging application, the text messaging application is opened and executes the core application such that the intended function of the text messaging application is performed.

A trap service manager may be used to create decoy icons for the mail application and the text messaging application. In FIG. 8B, decoy icons associated with the mail application are shown at 804b-1, 804b-2, 804b-3, and 804b-4, and decoy icons associated with the text messaging application are shown at 806b-1, 806b-2, and 806b-3. When a user selects one of the decoy icons 804b-1 through 804b-4, the enabled trap application of the mail application is executed. The trap application may perform a lockout function to lock the mobile device, may simulate the core application with a simulated display image populated with alternative data, or may perform any other suitable function to deceive the user or block the user's actions. When a user selects one of the decoy icons 806b-1 through 806b-3, the enabled trap application of the text messaging application is executed. The trap application may perform a lockout function to lock the mobile device, may simulate the core mobile application with a simulated display image populated with alternative data, or may perform any other suitable function to deceive the user or block the user's actions.

The locations of the decoy icons and/or the application icon may be dynamically determined. In at least one embodiment, the location of the decoy icons and/or the application icon of the mobile application may be dynamically determined each time mobile device 800 powers on, each time a user logs in (e.g., uses appropriate authentication to unlock the phone), or each time the menu of icons is re-displayed during an authenticated session. In at least one embodiment, the location of the application icon is determined based on configuration parameters (or default parameters) that provide a fixed location for the application icon, which may be defined by a suitable time frame (e.g., period of time, time of day, day, week, etc.). In other embodiments, the application icon may be dynamically assigned to a random location in the menu of icons. The locations of the decoy icons, however, may be dynamically assigned to random locations or to locations based on configuration parameters, which may be defined by a suitable time frame (e.g., period of time, day, week, etc.).

The authorized user may be notified of the assigned location of the application icons and the decoy icons as previously described herein. The location information can be provided in any suitable format such as, for example, the page, row, and column corresponding to the particular icon, x-y coordinates of the display screen of the mobile device, or a page number and sequential number of the icon within the page. For example, location information of application icon 806a in FIG. 8B could indicate page 1, row 3, column 1. In another example, the location information for application icon 806a could indicate page 1, icon number 9. In yet another example, location information of application icon 806a could indicate x-y coordinates of (0.5 in., 4 in.).

As shown in FIG. 8B, in at least one embodiment, the decoy icons of a particular mobile application may be visual replicas of their corresponding application icon, so that a user will be unable to distinguish, solely on appearance, which icon causes the core application to be executed and which icons cause a trap application to be executed. Moreover, it should be noted that, although FIG. 8B shows all of the decoy icons and the application icon for the text messaging and mail applications being displayed on a single page of the icon menu, the decoy icons and application icon for a particular mobile application could be displayed on any page of the icon menu and may or may not be displayed on the same pages with each other.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but does not preclude the presence or addition of one or more other features, integers, steps, operations, elements, components, and/or groups thereof. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

As used herein, unless expressly stated to the contrary, use of the phrase 'at least one of' and 'one or more of' refers to any combination of the named elements, conditions, or activities. For example, 'at least one of X, Y, and Z' and 'one or more of X, Y, and Z' are intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
   generating a menu of icons including an application icon and a decoy icon that correspond to a mobile application in a mobile device, the application icon assigned to a first location in the menu of icons and the decoy icon assigned to a second location in the menu of icons, wherein the first location for the application icon and the second location for the decoy icon are dynamically determined based, at least in part, on one or more configuration parameters associated with the mobile application;
   communicating icon location information to the mobile application;
   providing the menu of icons for display on a display screen of the mobile device;
   receiving a first indication of user input to select the decoy icon in the menu of icons;
   invoking the mobile application based on the decoy icon being selected;
   communicating, to the mobile application based on the decoy icon being selected, second location information indicating the second location in the menu of icon;
   determining, by the mobile application, the decoy icon was selected based on comparing the second location information to the icon location information; and
   preventing, by the mobile application, access to real data used by the mobile application of the mobile device based on determining the decoy icon was selected.

2. The method of claim 1, wherein the icon location information includes at least one of first location information indicating the first location in the menu of icons or the second location information indicating the second location in the menu of icons.

3. The method of claim 1, wherein the first and second locations are dynamically determined in response to the mobile device being powered on or the mobile device being unlocked based on receiving one or more valid credentials of a user.

4. The method of claim 1, further comprising:
   prior to generating the menu of icons, receiving a second indication of user input that specifies the one or more configuration parameters associated with the mobile application.

5. The method of claim 4, wherein the configuration parameter specifies the second location of the application icon in the menu of icons.

6. The method of claim 4, wherein the configuration parameter specifies a first time frame during which the application icon is assigned to the first location in the menu of icons and a second time frame during which the application icon is assigned to a third location in the menu of icons.

7. The method of claim 4, wherein the configuration parameter specifies a number of decoy icons corresponding to the mobile application, and the menu of icons includes the number of decoy icons.

8. The method of claim 1, wherein the decoy icon is a replica of the application icon.

9. The method of claim 1, further comprising:
   receiving, at an operating system of the mobile device, a notification from the mobile application indicating that the mobile application includes a trap application, wherein the decoy icon is included in the menu of icons based, at least in part, on the notification.

10. The method of claim 1, wherein, in response to receiving the first indication of user input to select the decoy icon, alternative data is used to populate at least a portion of a simulated display image of the mobile application, and wherein the simulated display image is provided for display in the display screen of the mobile device.

11. The method of claim 1, wherein the mobile device is locked by the mobile application in response to receiving the first indication of user input to select the decoy icon.

12. The method of claim 1, wherein the communicating the second location information to the mobile application based on the decoy icon being selected occurs (1) after the first indication of user input is received and before the mobile application is invoked, (2) after the mobile application is invoked, or (3) at the time the mobile application is invoked.

13. A mobile computing device, the mobile computing device comprising:
   a memory element including first instructions stored therein;
   a graphical display screen; and
   a processor, wherein the first instructions are executable by the processor to:
      generate a menu of icons including an application icon and a decoy icon that correspond to a mobile application in the mobile computing device, the application icon assigned to a first location in the menu of icons and the decoy icon assigned to a second location in the menu of icons, wherein the first location for the application icon and the second location for the decoy icon are dynamically determined based, at least in part, on one or more configuration parameters associated with the mobile application;

communicate icon location information to the mobile application;

provide the menu of icons for display on the graphical display screen;

receive a first indication of user input to select the decoy icon in the menu of icons;

invoke the mobile application based on the decoy icon being selected; and communicate, to the mobile application based on the decoy icon being selected, second location information indicating the second location in the menu of icon, wherein the mobile application includes second instructions that are executable by the processor to:

receive the second location information;

determine the decoy icon was selected based on comparing the received second location information to the icon location information; and prevent, by the mobile application, access to real data used by the mobile application of the mobile computing device based on determining the decoy icon was selected.

14. The mobile computing device of claim 13, wherein the first instructions are further executable by the processor to:

prior to the menu of icons being generated, send a notification to a user of the mobile computing device that includes the location information of the application icon.

15. The mobile computing device of claim 13, wherein preventing access to real data includes one of:

locking the mobile computing device; or using alternative data to populate at least a portion of a simulated display image associated with the mobile application and providing the simulated display image for display in the graphical display screen.

16. A non-transitory computer readable medium having program instructions stored therein, wherein the program instructions are executable by a mobile device to perform operations comprising:

generating a menu of icons including an application icon and a decoy icon that correspond to a mobile application in the mobile device, the application icon assigned to a first location in the menu of icons and the decoy icon assigned to a second location in the menu of icons, wherein the first location for the application icon and the second location for the decoy icon are dynamically determined based, at least in part, on one or more configuration parameters associated with the mobile application;

communicating icon location information to the mobile application;

providing the menu of icons for display on a display screen of the mobile device;

receiving a first indication of user input to select the decoy icon in the menu of icons;

invoking the mobile application based on the decoy icon being selected;

communicating, to the mobile application based on the decoy icon being selected, second location information indicating the second location in the menu of icon;

determining, by the mobile application, the decoy icon was selected based on comparing the second location information to the icon location information; and preventing, by the mobile application, access to real data associated with a user of the mobile device based on determining the decoy icon was selected.

17. The non-transitory computer readable medium of claim 16, wherein the program instructions are executable by the mobile device to perform further operations comprising:

receiving a notification from the mobile application indicating that the mobile application includes a trap application, wherein the decoy icon is included in the menu of icons based, at least in part, on the notification.

* * * * *

UNITED STATES PATENT AND TRADEMARK OFFICE
CERTIFICATE OF CORRECTION

Page 1 of 1

PATENT NO. : 10,599,878 B2
APPLICATION NO. : 15/817670
DATED : March 24, 2020
INVENTOR(S) : Mohammed Mujeeb Kaladgi et al.

It is certified that error appears in the above-identified patent and that said Letters Patent is hereby corrected as shown below:

In the Claims

Column 19, Line 67 (Claim 1): Replace "icon" with --icons--;

Column 21, Line 22 (Claim 13): Replace "icon" with --icons--;

Column 22, Line 26 (Claim 16): Replace "icon" with --icons--.

Signed and Sealed this
Eighth Day of September, 2020

Andrei Iancu
*Director of the United States Patent and Trademark Office*